March 14, 1939. J. D. FERRY 2,150,273
FOOD COOKING APPARATUS
Filed Dec. 8, 1936 3 Sheets-Sheet 1
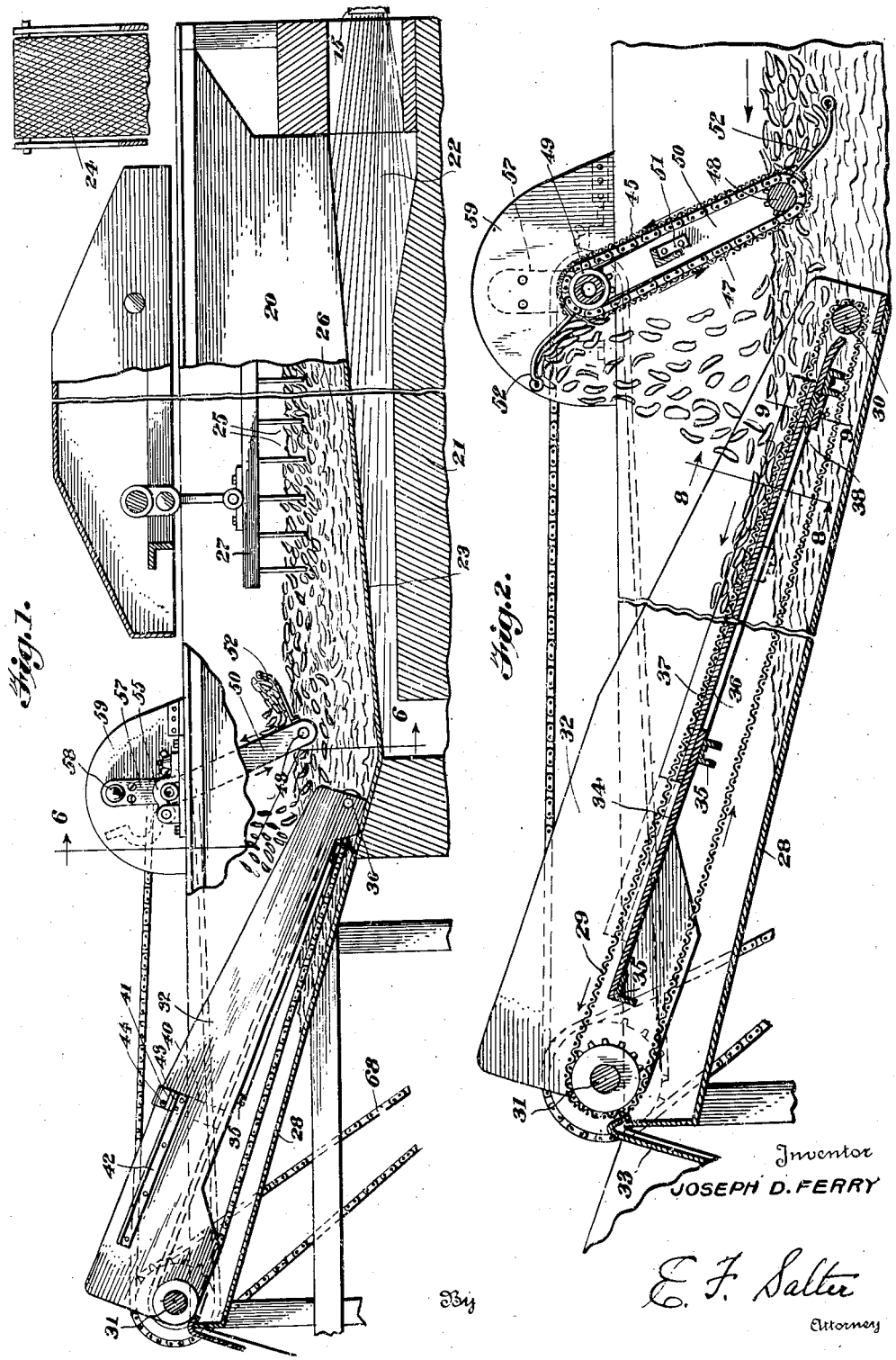
Inventor
JOSEPH D. FERRY
By E. F. Salter
Attorney March 14, 1939.   J. D. FERRY   2,150,273
FOOD COOKING APPARATUS
Filed Dec. 8, 1936   3 Sheets-Sheet 2

Inventor
JOSEPH D. FERRY

By E. F. Salter
Attorney

March 14, 1939.   J. D. FERRY   2,150,273
FOOD COOKING APPARATUS
Filed Dec. 8, 1936   3 Sheets-Sheet 3
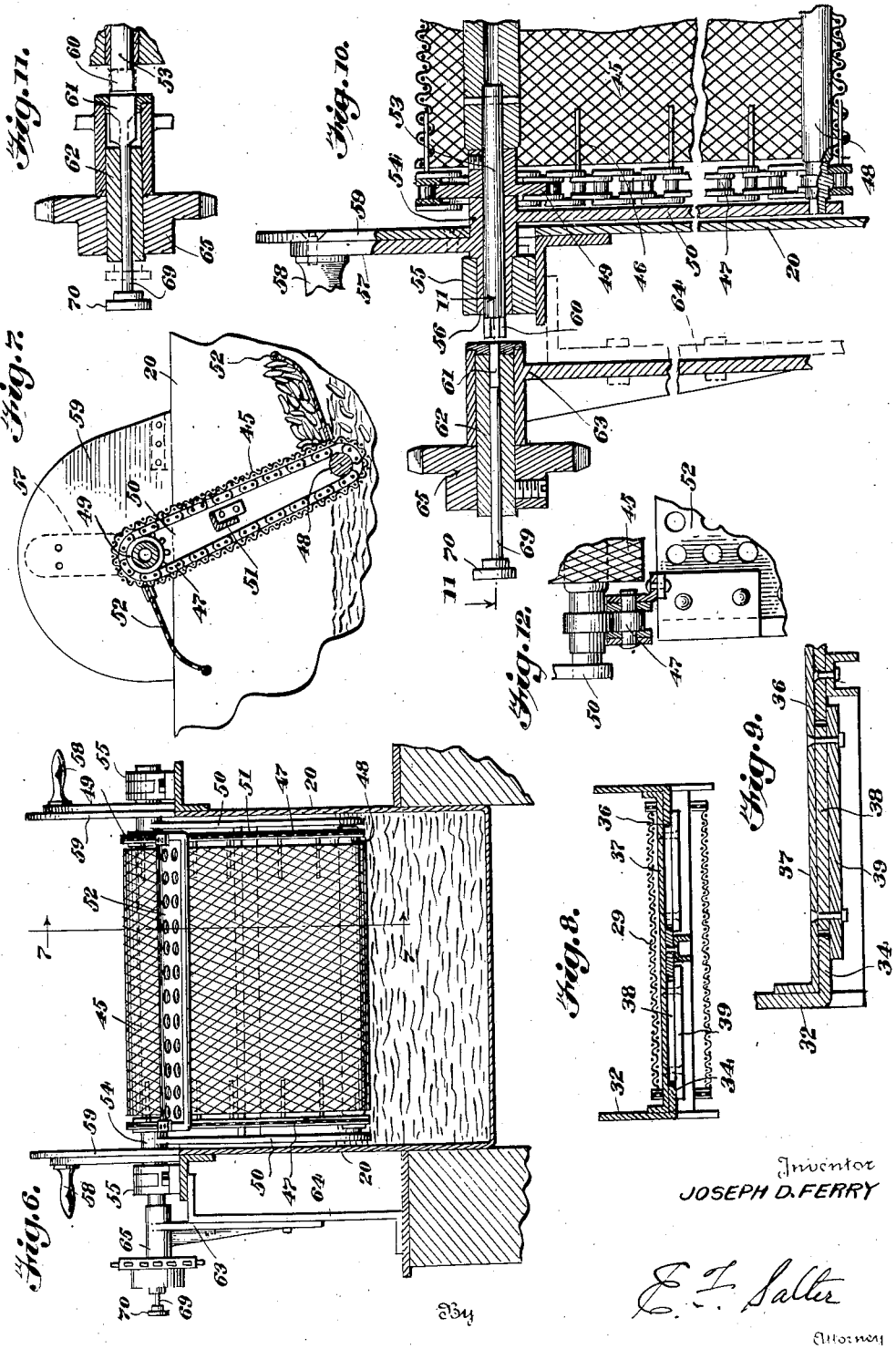
Inventor
JOSEPH D. FERRY
By
E. T. Salter
Attorney Patented Mar. 14, 1939

2,150,273

UNITED STATES PATENT OFFICE 2,150,273

FOOD COOKING APPARATUS

Joseph D. Ferry, Harrisburg, Pa.

Application December 8, 1936, Serial No. 114,833

12 Claims. (Cl. 53—7)

The present invention relates generally to an apparatus for cooking foodstuffs, and more particularly the cooking of potato chips such as forms a part of my Patent 2,056,845, granted October 6, 1936, my primary object being to so improve the cooking apparatus as to provide for the thorough cooking of such chips as would otherwise be slightly under-cooked when potatoes of a certain character are used.

It has been found that chips produced from certain potatoes do not thoroughly cook when they pass through the cooking kettle on the surface of the cooking oil or in other words when they have been insufficiently immersed in the oil and, therefore, an important object of the present invention is to provide an arrangement which may be used under such circumstances to co-operate with a toasting arrangement in conjunction with the discharge conveyor to insure complete cooking of the chips which might otherwise discharge in an under-cooked state.

In my patent above referred to an arrangement is disclosed for the heat rising from the cooking oil to affect the chips on the discharge conveyor after they have been removed from the oil, and I now provide means to increase this effect to a cooking action, and which means may be easily and quickly brought into operation to insure proper exposure of the chips to this additional cooking, in instances where potatoes are used which require this additional treatment.

However, I preferably provide, for the above purpose, such means as are readily displaceable from effective position so that when additional cooking of the chips is not necessary, there will be no interference with the normal or usual cooking operation.

Briefly, my present improvements contemplate adjustable means in connection with the discharge conveyor whereby the chips thereon may be exposed to more or less heat rising from the cooking oil, together with means capable of ready, easy installation for lifting the chips from the cooking oil at a point adjacent the discharge conveyor, reversing or turning the chips completely over and then releasing the same for deposit on the conveyor and in the cooking oil in the immediate region thereof to insure that the chips which have been uppermost during the major portion of the cooking operation will be lowermost on the conveyor and thus exposed in a maximum degree to the additional heat.

The foregoing and other objects of my invention will plainly appear in the following detailed description of the best mode so far devised for carrying my invention into practical use, and by reference to the accompanying drawings, which form a part of this specification, and in which Figure 1 is a side view, partly in elevation and partly in section, Figure 2 is an enlarged partial longitudinal section, Figure 3 is a top plan view of the discharge end of the cooker, partly broken away, Figure 4 is a detail bottom plan view of the heat apron of the conveyor, Figure 5 is a fragmentary vertical transverse sectional view taken on line 5—5 of Figure 3, Figure 6 is a vertical transverse sectional view taken through the complete cooker on line 6—6 of Figure 1, Figure 7 is a detail longitudinal sectional view taken on line 7—7 of Figure 6, Figure 8 is a detail vertical transverse sectional view taken on line 8—8 of Figure 2, Figure 9 is an enlarged partial vertical transverse section through the heat apron on line 9—9 of Figure 2, Figure 10 is an enlarged partial vertical transverse section through one side of the cooker, Figure 11 is a detail sectional view taken on line 11—11 of Figure 10, and Figure 12 is an enlarged fragmentary sectional detail of a portion of the supplemental conveyor.

Referring now to these figures, and particularly to Figure 1, I have shown an elongated cooking kettle 20 mounted in connection with a heater generally indicated at 21 and within the chamber of which a flame indicated at 22 from a suitable burner 15 impinges against the bottom 23 of the kettle which slopes downwardly at a slight incline toward the discharge end.

Previously treated raw potato slices are fed into the inlet end of the cooking kettle 20 by any suitable conveyor as, for instance, indicated in part at 24 in Figure 1, and within the kettle the chips 25 are advanced in the cooking oil 26 by an impelling mechanism 27 which may be of the type disclosed in my aforementioned patent. The burner 15 provides for the heating of the cooking oil to a temperature which gradually diminishes toward the discharge end of the kettle and this assists in the advancement of the chips. The details thus far do not concern my present improvements except to explain the arrangement of the parts thereof.

In the upwardly sloping discharge end 28 of the kettle 20 an endless, preferably mesh conveyor 29 operates around the lower roller or bar 30 and the upper rotatable shaft 31, between a pair of side walls 32. This conveyor normally acts to receive the chips fed in the cooking oil as previously set forth and to carry the chips upwardly for discharge from its upper end onto a discharge apron 33. From Figures 1 and 2, it will be seen that the discharge conveyor 29 is arranged in spaced substantially parallel relation to the sloping bottom 28 of the discharge end of the kettle and that the major portion of the conveyor is above the surface of the oil. By reason of the fact that the major portion of conveyor 29 is above the level of the oil, surplus oil is allowed to drain from the chips during the travel thereof on the conveyor and at the same time the chips are subjected to a drying or toasting in the presence of the heat rising from the oil. This heat is preferably confined to a certain extent beneath a substantially flat apron 34 extending across the space between the conveyor side walls parallel to and beneath the upper run of the conveyor and reenforced by cross rails 35 upon which the apron rests.

According to my present invention, the lower portion of the conveyor apron 34 has a pair of elongated openings indicated at 36. A sliding door or cover 37 overlies both openings 36 and is provided on its bottom surface with transverse spacing strips 38 disposed within the openings 36 as guides and to limit movement of the cover downwardly of the apron to the fully closed position shown in Figure 2. The cross strips 38 are of the same thickness as the apron 34 and act as spacers between the adjustable cover 37 and cross strips 39 the ends of which extend beyond the sides of the openings 36 to slidably engage the lower surface of the apron and thus hold the cover snugly thereon. The strips 38 and 39 are secured to the cover plate 37 by bolts or other appropriate fastening elements.

At one side of its upper end, the door or cover 37 has an upstanding arm 40, as shown in Figures 3 and 5, which is bent to embrace the upper edge of the adjacent side wall 32 of the conveyor. The arm 40 terminates in a lateral extension 41 overlying an apertured longitudinal side rail 42 on the external surface of one of the side walls 32. To this extension 41 is secured a guide piece 43, the inner offset end of which underlies the rail 42. Thus, the rail 42 is slidably confined between extension 41 and its guide piece 43, both of the latter of which are apertured in vertical line to receive a latch pin 44 adapted to be extended through any opening 45 of guide rail 42 to securely hold the cover in selected position for uncovering desired portions of the openings 36.

By the above means, heat will be permitted to rise through the openings 36 whenever its direct action against the chips on the discharge conveyor is required as when it is observed considerable chips are being discharged in an underdone state. This frequently occurs when potatoes of certain varieties more difficult to completely cook are used, and it is found that the chips which have proceeded on the surface of the oil have been insufficiently immersed by the impeller mechanism 27 or have not been turned during the cooking operation to evenly cook the same. In such instances, it has been found that the top flow of chips through the cooking kettle fry with soft centers while the under chips are finished or completely cooked. I propose to remedy this difficulty by withdrawing the chips from the cooking oil at a point near the lower receiving end of the discharge conveyor 29 and turning the chips over onto said conveyor and into the cooking oil in the immediate region thereof so as to insure that the uppermost chips as they are taken from the oil will be lowermost on the conveyor. In this way, the insufficiently cooked chips will come in direct contact with the hot cooking oil adjacent the conveyor and will be positioned above the openings 36 of the apron 34 for the direct action of the rising heat when the cover is more or less displaced from its normal closed position.

To the above end, I provide a supplemental lifting conveyor or elevator of the endless mesh type as seen at 45, connected at its sides by a series of pins 46 to the side sprocket chains 47 passing around a lower cross roller or bar 48 and upper sprocket wheels 49. These parts are carried by side bars 50, cross roller or bar 48 connecting the lower ends of the side bars, and an intermediate cross bar 51 thus completing a rigid frame.

Secured at their ends to the chains 47 at spaced points around the lifting conveyor are outstanding curved reticulated lifting wings 52 which, since rotation of the conveyor is counterclockwise dip downwardly into the oil 26 at the discharge side and on rising at the opposite side lift the chips from the oil and carry the same upwardly around the upper end of the conveyor, permitting the same to face onto the discharge conveyor 29 as plainly seen in Figure 2. Preferably the speed of movement of lifting conveyor 45 is such that the chips will be held by centrifugal force against dropping until each lifting wing 52 has passed completely around the upper end of the conveyor.

As the conveyor 45 need be used only when the condition of the potatoes makes it necessary, I provide for its complete and ready installation and removal by mounting the upper sprocket wheels 49 on connected alined shafts 53 journalled through the upper bearings 54 of the side bars 50 for disposal in split bearings 55 on the upper side edges of the kettle 20 as plainly seen by a comparison of Figures 1, 3 and 10. The upper sections of bearings 55 may be lifted to permit of insertion and removal of the laterally extended tubular portions 56 of the journals 54 through which shafts 53 extend.

The side bars 50 also have upstanding extensions 57 having at their upper ends handles 58 and to these extensions are rigidly secured side shields 59 which, when the conveyor shafts are within the split bearings 55, rest at their lower straight edges on the upper side edges of the kettle 20 to thus support the conveyor in depending inclined position within the kettle 20. These shields 59 also serve to prevent the chips from falling laterally from the ends of the lifting wings 52 as the latter round the upper end of the lifting conveyor.

One of the shafts 53, as best seen in Figures 10 and 11 has an outer exposed end which is diametrically slotted at 60 for cooperation therewith of a flat key coupling member 61 lengthwise shiftable in respect to the slotted end of a shaft 62.

The shaft 62 is rotatable, in axial alinement with the shafts 53 within a bearing bracket 63 on an upright 64 rising from the supporting frame for the kettle 20 and is provided with a sprocket wheel 65. A sprocket chain 66 connects this wheel 65 with a sprocket wheel 67 (see Figure 3) on the upper shaft 31 of the discharge conveyor 29, the shaft 31 being driven through a sprocket chain 68 from any suitable source of power for instance an electric motor (not shown).

The key coupling 61 is formed upon one end of a rod 69 shiftable axially of shaft 62 with a knob or handle 70 upon its other end whereby, when the lifting conveyor has been installed in the kettle 20, it is an easy matter to shift rod 69 until the key 61 bridges the adjacent ends of shafts 53 and 62 so as to thus detachably couple the former with the driving connections for causing movement of the lifting conveyor to perform the offices hereinbefore assigned thereto.

It will be understood that the key coupling may be readily disconnected, and that by opening the split bearings 55, the entire lifting conveyor assembly may be raised free of the kettle and withdrawn by means of its handles 58 for storage until such time as it is again needed.

While I have shown and described the preferred embodiment of my invention, it is to be understood that various changes in the size, shape and arrangement of parts may be resorted to without departing from the spirit of my invention or the scope of the subjoined claims.

Having thus described the invention, what is claimed is:

1. The combination with a cooking kettle for the reception of a cooking liquid and articles of food, a discharge conveyor extending into the kettle and having means to adjustably control the rise of heat through the conveyor from the cooking liquid, and means for transferring the articles of food from the cooking liquid and turning the same over onto the conveyor.

2. The combination with a cooking kettle for holding a cooking oil, a discharge conveyor extending over a portion of the cooking oil within the direct influence of the heat rising from the oil, means for controlling the direct passage of such heat through said conveyor, and means for withdrawing articles from the cooking oil and turning the same over and releasing the articles in the immediate region of the receiving end of the conveyor.

3. The combination with a cooking kettle for holding a cooking oil, a discharge conveyor extending into the kettle over a portion of the cooking oil in the direct influence of the heat rising from the oil, means for controlling the passage of heat through the conveyor, and a second conveyor demountably in connection with the kettle for withdrawing articles from the cooking oil and turning the same over onto said discharge conveyor.

4. In a cooking apparatus including a cooking kettle for holding cooking oil, a foraminous discharge conveyor extending into the cooking oil and rising to a point above the level thereof, an apron below the conveyor and above the cooking oil, having an opening permitting the rise of heat therethrough, and adjustable means covering said opening whereby the latter may be more or less opened.

5. In a cooking apparatus including a cooking kettle for holding cooking oil, a foraminous discharge conveyor extending into said kettle and rising to a point above the level of the cooking oil, an apron forming a shield between the oil and conveyor to intercept rising heat and having an opening therein, and a closure for said opening consisting of a slidably adjustable cover.

6. In a cooking apparatus including a cooking kettle for the reception of a cooking liquid and foodstuffs, a conveyor frame at one end thereof, a foraminous conveyor operating in said frame and rising from and extending above the cooking liquid, an apron forming a heat shield between the liquid and conveyor and having an opening permitting the heat to rise directly through the conveyor, a slidably adjustable closure for said opening, and latch-controlled means carried by the said cover and the conveyor frame for holding the cover in adjusted position with respect to the opening.

7. In a cooking apparatus including a cooking kettle for the reception of a cooking liquid and foodstuffs, a discharge conveyor, an endless conveyor demountably associated with the kettle adjacent said discharge conveyor and operating in an uprightly inclined position with its lower portion depending into the liquid for elevating articles from the liquid and overturning the same onto said discharge conveyor, and driving connections for the endless conveyor externally of the kettle and including a detachable coupling.

8. In a cooking apparatus including a cooking kettle for holding cooking oil, an endless discharge conveyor, an endless elevator having outstanding wings and an upper driven shaft, bearings on the kettle to detachably support said shaft, shields carried by the upper side portions of the elevator to engage the kettle and support the elevator with its lower end extending into the oil and its upper end in position to discharge onto said discharge conveyor, a drive shaft journalled exteriorly of the kettle in axial alinement with said driven shaft, and a shiftable coupling in connection with said drive shaft for engagement with the said driven shaft.

9. In a cooking apparatus including a cooking kettle for holding cooking oil, a discharge conveyor, an endless elevator adjacent said discharge conveyor and having outstanding wings and an upper driven shaft, bearings on the kettle to detachably support said shaft, shields carried by the upper side portions of the elevator to engage the kettle and support the elevator with its lower end extending into the oil and its upper end in position to discharge onto said discharge conveyor, a drive shaft journalled exteriorly of the kettle in axial alinement with said driven shaft, and a shiftable coupling in connection with said drive shaft for engagement with the said driven shaft, said elevator having outstanding handles for use in its application to and removal from the kettle.

10. In a cooking apparatus including a cooking kettle for holding cooking oil and having a discharge conveyor, an elevator for withdrawing articles from the oil and overturning the same onto said conveyor including an endless elevator for disposition uprightly in the kettle, including a frame, an upper driven shaft in the frame, upper side shields to rest on the kettle for supporting the frame against swinging movement, split bearings carried by the kettle to detachably receive and support said shaft, a drive shaft rotatably supported exteriorly of the kettle in axial alinement with said driven shaft, and a detachable coupling for connecting said drive shaft with the said driven shaft.

11. In a cooking apparatus including a kettle for holding a cooking liquid, a foraminous discharge conveyor extending over a portion of the cooking liquid within the direct influence of heat rising therefrom, and means associated with said conveyor for adjustably controlling the passage of heat therethrough.

12. In a cooking apparatus including a kettle for holding a cooking liquid, a discharge conveyor leading therefrom, an endless elevator having outstanding wings and an upper driven shaft, shields carried by the upper side portions of the elevator and engageable with the kettle to support the elevator with its lower end extending into the cooking liquid and its upper end in position to discharge onto said discharge conveyor, and drive means connected to said driven shaft.

JOSEPH D. FERRY.